(12) United States Patent
Sakamuri et al.

(10) Patent No.: US 10,719,516 B2
(45) Date of Patent: Jul. 21, 2020

(54) SCALABLE MULTISTAGE PROCESSING OF QUERIES WITH PERCENTILE FUNCTIONS

(71) Applicant: Oracle International Corporation, Redwood Shores, CA (US)

(72) Inventors: Venkatesh Sakamuri, San Mateo, CA (US); Huagang Li, San Jose, CA (US); Sankar Subramanian, Cupertino, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 16/113,633

(22) Filed: Aug. 27, 2018

(65) Prior Publication Data
US 2020/0065413 A1 Feb. 27, 2020

(51) Int. Cl.
*G06F 16/00* (2019.01)
*G06F 16/2455* (2019.01)
*G06F 7/24* (2006.01)

(52) U.S. Cl.
CPC ......... *G06F 16/24553* (2019.01); *G06F 7/24* (2013.01)

(58) Field of Classification Search
CPC .............................. G06F 16/24553; G06F 7/24
See application file for complete search history.

(56) References Cited

U.S. PATENT DOCUMENTS

| 8,880,481 | B1* | 11/2014 | Harada | G06F 16/24532 |
| | | | | 707/692 |
| 2018/0165335 | A1* | 6/2018 | Kong | G06F 16/244 |

* cited by examiner

*Primary Examiner* — Jared M Bibbee
(74) *Attorney, Agent, or Firm* — Hickman Palermo Becker Bingham LLP (57) ABSTRACT

A method and system for processing database queries containing aggregate functions. The query may specify fewer groups than there are processes available to process the queries. Further, the queries may target a set of rows and specify a sort-by key and a group-by key. The method and system further includes determining that the queries specify application of the aggregate function to each of a plurality of groups that may correspond to a plurality of distinct values of the group-by key and determining that plurality of processes are available to process the queries. The method and system also includes determining the plurality of ranges of a composite key that may be formed by combining the group-by key and the sort-by key and assigning each range of the plurality ranges to a corresponding process to calculate the aggregate function.

22 Claims, 5 Drawing Sheets

SCALABLE MULTISTAGE PROCESSING OF QUERIES WITH PERCENTILE FUNCTIONS

FIELD OF THE INVENTION

The present invention relates to methods and systems for scalable multistage processing of queries and, more particularly, scalable multistage processing of queries with percentile functions.

BACKGROUND

Percentile functions are inverse distribution functions which take a sorted list of values and a measure as inputs, and return a value located at the appropriate position in the sorted list as output. Median is an example of the percentile function where the measure is 0.5. Examples of the percentile functions and formulae may include PERCENTILE_DISC(p) and PERCENTILE_CONT(p).

PERCENTILE_DISC(p): is an inverse distribution function that assumes a discrete distribution model. It takes a percentile value (p) and a sort specification and returns an element from the set. Nulls are ignored in the calculation.

PERCENTILE_CONT(p): is an inverse distribution function that assumes a continuous distribution model. It takes a percentile value (p) and a sort specification, and returns an interpolated value that would fall into that percentile value with respect to the sort specification. Nulls are ignored in the calculation.

As mentioned above, for the median function, P is 0.5. Stated another way, the median function calls for the value in the list position that follows 50% of the values in a sorted list.

According to the percentile definition, to compute the final percentile result the list must be fully sorted. For this reason, using conventional techniques, the degree of parallelization used to process queries that include percentile functions is usually the same as or less than the number of sorted groups to which the percentile function is applied. For example, assume that a table "emp" includes the salaries of all employees of a company. Such a query may appear as follows (Q1):

```
SELECT
    Percentile_disc(0.5) within group (order by salary)
    FROM emp;
```

To process a query that requires the median salary of all workers in the company, a single ordered list with the salary values from all rows in the emp table is necessary. Consequently, no parallelization of the aggregation portion of the query is possible, though other portions of the query may still be parallelized. On the other hand, to process a query that requires the median salary for each department in a company that has three departments, three ordered lists need to be created. Such a query may appear as follows (Q2):

```
SELECT
    Percentile_disc(0.5) within group (order by salary)
    FROM emp
    group by department;
```

Assuming that there are three distinct department values ("sales", "accounting", "service"), the work associated with deriving the medians for this query can be spread among three processes, one for the ordered list for each department. If each process is assigned to a different processor, then the computational power of three processors can be put to use, in parallel, to execute the percentile calculation required by the query.

Unfortunately, the number of groups involved in a query with a percentile function may be significantly smaller than the number of computing resources (e.g. processors) available to perform the work. For example, there may be 10 processors available to execute Q2, even though there are only three distinct departments. In such cases, some computing resources go unused, and the query processing time of queries with percentile functions may be longer than it would be if it were possible to take advantage of all available computing resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments of the present invention are illustrated by way of example and not as limitation in the figures of the accompanying drawings, in which like references indicate similar elements and in which.

Other features of the present embodiments will be apparent from the accompanying drawings and from the detailed description that follows.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Disclosed are techniques for processing database queries that contain percentile functions in a way that allows the work required by such queries to be executed with a degree of parallelism that is greater than the number of groups to which the percentile functions are applied. Rather than distribute work using hash distribution based on the group-by key (which limits the parallel sort processes to the number of groups), work is distributed using range distribution based on a composite key, as described in greater detail below. Using range distribution, the number of parallel sort processes is independent of the number of distinct group-by key values. Specifically, the composite key-value range can be subdivided into a number of sub-ranges equal to whatever degree of parallelism is desired.

With respect to the composite key, each such query specifies a group-by key and a sort-by key. To distribute the work, the database server determines a plurality of ranges of a composite key formed by combining the group-by key and the sort-by key. Each range of the plurality of ranges is assigned to a corresponding process of the plurality of processes that are to be used to perform the work.

For the purpose of explanation, it shall be assumed that the desired degree of parallelism is equal to the number of processors available to perform the work. Under these conditions, each available processor will be executing one of the parallel processes involved in the percentile operation. However, the techniques described herein are not limited to a one-process-per-processor embodiment. For example, when 10 processors are available, the database server may determine that the percentile function should be executed with a degree of parallelism of 20. In that case, the composite key value range is divided up into 20 subranges, each of which is assigned to a distinct process. Those 20 processes then execute on the 10 available processors.

In one embodiment, the composite key (also known as the range distribution key) is formed of four parts: the group-by key, an aggregate code, the sort-by key, and a cycle sequence number. As shall be explained in detail hereafter, a query can have multiple aggregates. The aggregate code uniquely identifies, for each record, the aggregate for which the record was generated. The cycle sequence number is used to avoid problems with data clustering. For example, it is possible that the first three components of keys are the same, and all that data will go to one process. The addition of a cycle sequence number key helps equalize the distribution of the records based on ranges.

Once ranges have been assigned to the processes, for each row in the plurality of rows selected by the query, the database server forms a composite key value based on a group-by key value associated with the row, and the sort-by key value associated with the row. Then, the database server distributes a record that contains the composite key value to the process, of the plurality of processes, that is assigned to the range, of the plurality of ranges, into which the composite key value of the row falls. At each process of the plurality of processes, the records received by the process are sorted based on the composite key values contained in the records.

For each group of the plurality of groups, the database server determines whether the records with composite key values that contain the group-by key value of the group were sent to a single process. For each group where records were sent to a single process, that single process determines the result of the percentile function for the group based on the sorted records for the group.

For each group where records with composite key values that contain the group-by key value of the group were sent to two or more processes, the database server identifies the two or more processes that received any records with composite key values containing the group-by key value of the group. Those processes are referred to here as the processes that "cover the group". Each process covered by the group determines a local-count for the group. The local-count for the group indicates how many records that were sent to the process have composite key values that contain the group-by key value of the group.

Based on (a) the local-counts for the group from the processes that cover the group and (b) a measure for the percentile function, the database server determines which particular process that covers the group is to compute the percentile function result for the group. The particular process thus identified then computes the percentile function result for the group.

In one embodiment, based on local counts from the parallel sort processes, the query coordinator computes cumulative counts and global counts and provides this information to the processes. Based on these three counts, each process then computes the percentile function locally. For each process, if a percentile result is not local in that process, then either a preceding or a succeeding process will compute the result.

Hash Distribution Based on Group-by Key Values

Figure 1:
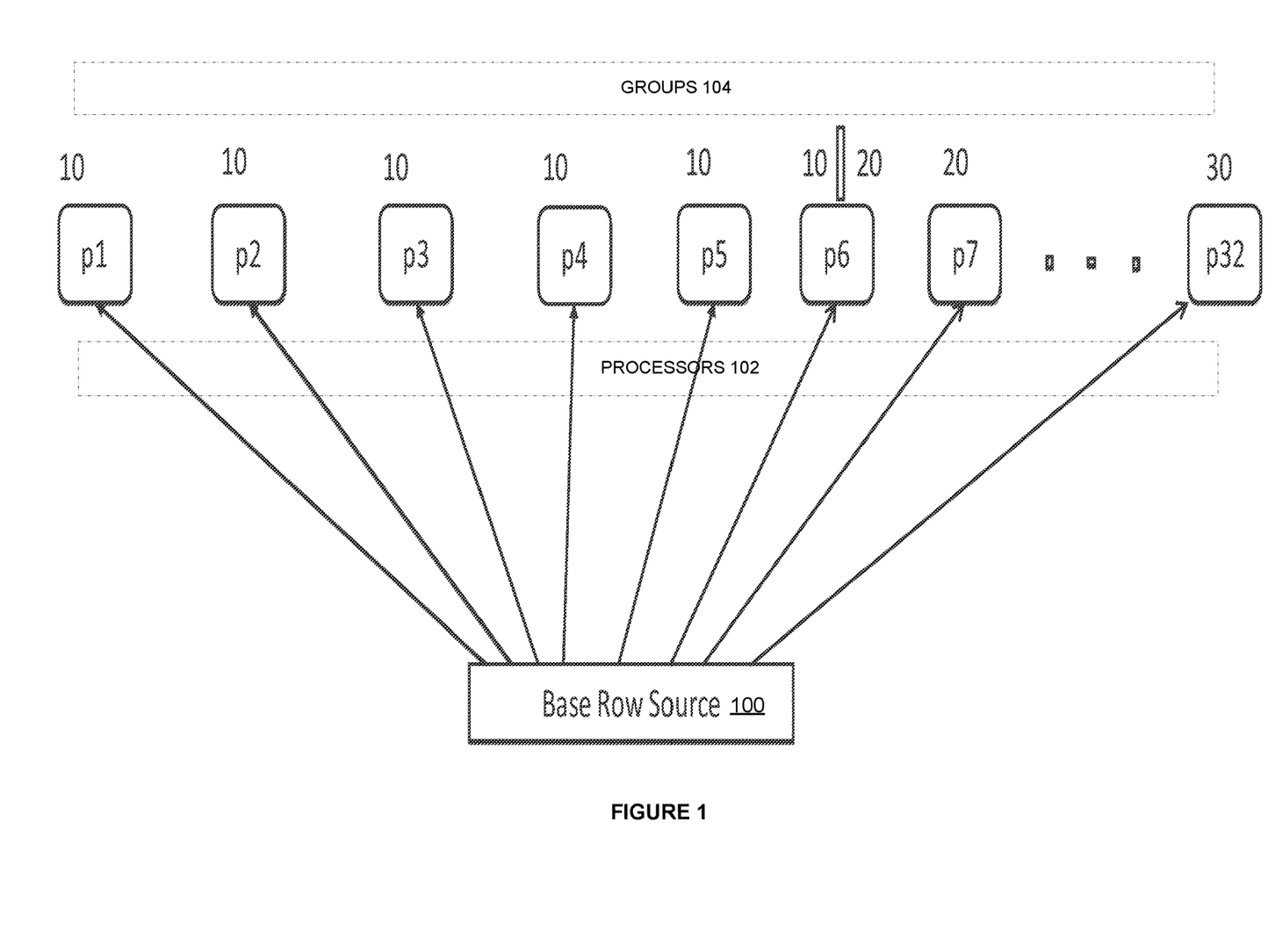
FIG. 1 illustrates a non-scalable approach that was previously used on receiving a query with a percentile function, according to one embodiment.

FIG. 1 illustrates a non-scalable approach that was previously used on receiving a query with a percentile function. Considering a simple example to illustrate the problem. A query with a percentile function may be:

```
Select /* + PARALLEL(32) */
    sum(SAL),
    Percentile_disc(0.4) within group(order by SAL)
    From EMP
    Group by DEPTNO
```

For the purpose of explanation, it shall be assumed that the above-listed query produces only three different groups 104—DEPTNO (10,20,30). Stated another way, the group-by key has only three distinct values: 10, 20 and 30. Previously, each process amongst processes 102 was assigned one of the distinct group-by values, thereby making that process responsible for the group that corresponded to that value. If there were three groups in groups 104 as illustrated in the FIG. 1, then only three processes of processes 102 are involved in the computation. Other processes of processes 102 may sit idle. In the current approach, salary data for the three groups is hash distributed, based on the group-by key values, to only three processes (p1, p2, p3) while other processes p4-p32 sit idle. When there are more processes available than distinct values of the group-by key, not all processes will be used for execution of the query. Further, in the presence of percentile and/or median functions, the parallelism used to perform other aggregates required by the query may also be limited by the number of distinct group-by values, yielding very poor performance. Consequently, adding a percentile function to an existing group-by query may slow down the query significantly, due to the non-scalable single stage aggregation model which was previously used for inverse distribution functions like percentiles.

Range Distribution Based on M Ranges

Rather than hash-distributing the rows that are selected by a query that contains a percentile function based on the group-by key values of the rows, the techniques described herein distribute the rows among processes using a range-based distribution based on composite key values. In range-based distribution, the number of processes that participate in the operation is not limited by the number of distinct values of the group-by key. Rather, the database server can employ any number of processes during execution of the query. The number of processes that are involved is dictated by the number of ranges that are used to distribute the rows, and the number of ranges is computed based on the number of processes available to participate in the percentile function computation.

For the purpose of explanation, it shall be assumed that M processors are available to process a query that contains a percentile function. It shall also be assumed, to execute the percentile function, each processor is to execute one parallel process. (As mentioned above, this need not be the case). Under these circumstances, the database server establishes M ranges, one for each available processor. The efficiency of the system will be greatly affected by how the M ranges are selected. For example, if M is 10, but 90% of the rows fall into only one of the 10 ranges, then the processor associated with that one range will be overworked and the other 9 processors will be underutilized. Further, it cannot be assumed that ranges of approximately the same size will result in an even distribution of the selected rows among the available processors. For example, if the range distribution is based on age values, and the full range [1-100] is divided into ten ranges that each covers ten values, it is still possible for the workload to be skewed if the majority of rows have age values between 20 and 30.

Therefore, in one embodiment, the boundaries of the M ranges are determined by sampling a subset of the set of rows that are selected by the query that contains the percentile function. Based on the sampling, the M ranges are chosen such that each range of the M ranges covers approximately a same number of rows from sampling as each other range of the M ranges. If the sampling accurately reflects the full set of rows selected by the query, then each of those M ranges will approximately cover an equal number of rows from the full set.

Figure 2:
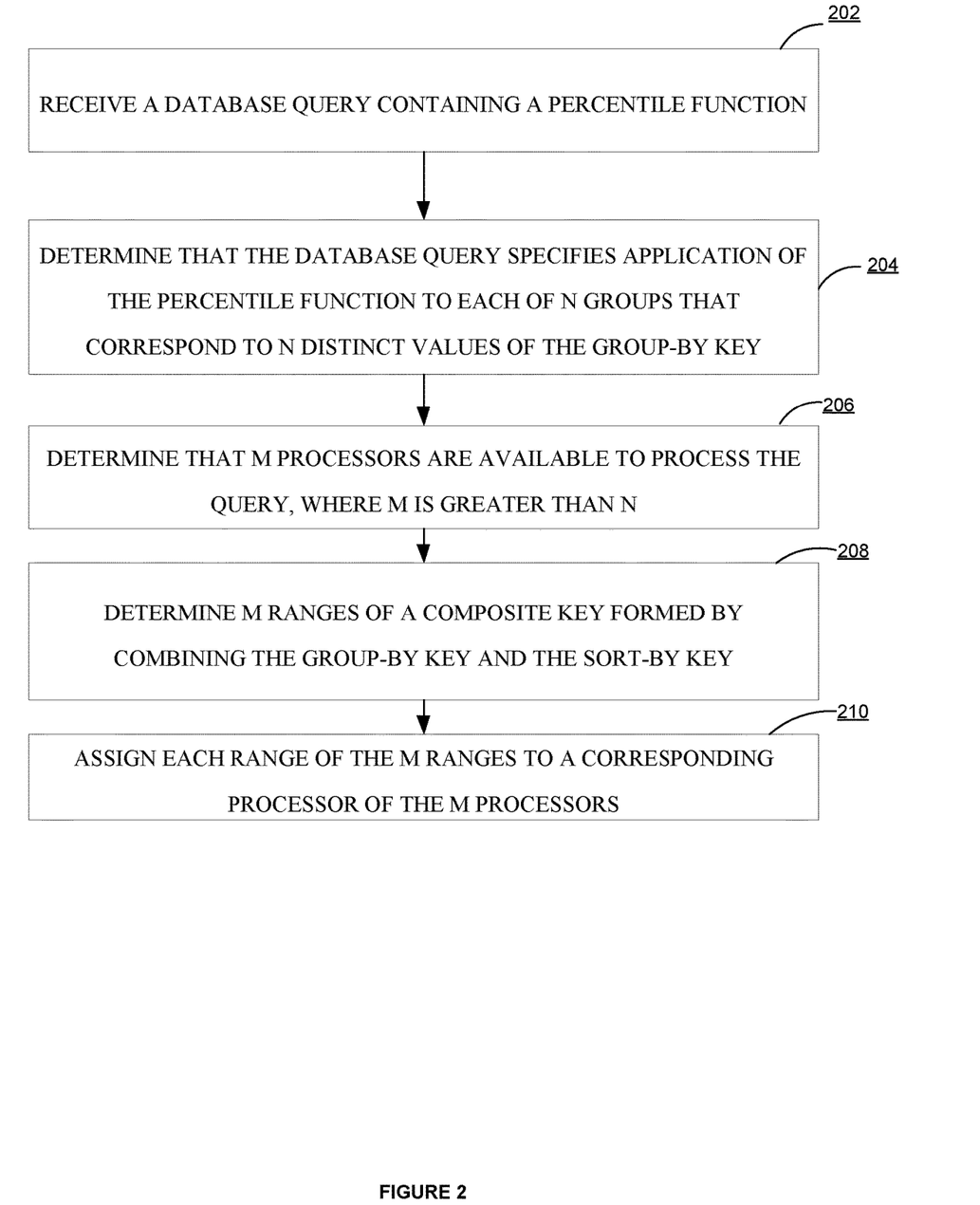
FIG. 2 is a process flow diagram detailing the steps between receiving a database query and assigning each range to a process, according to one embodiment.

FIG. 2 is a process flow diagram detailing the steps between receiving a database query and assigning each range to a process, according to one embodiment.

In one or more embodiments, a method for processing a query containing percentile functions may include receiving the query containing a percentile function 202. The query may specify a group-by key that, when executed against the target table, produces fewer groups than there are processes available to process the query. Further, the query may target a set of rows and specify a sort-by key and a group-by key. The method further includes determining that the query specifies application of the percentile function to each of N groups that may correspond to N distinct values of the group-by key 204 and determining that M processes are available to process the query, where M is greater than N 206. The method also includes determining M ranges of a composite key that may be formed by combining the group-by key and the sort-by key 208 and assigning each range of the M ranges to a corresponding process of the M processes 210.

The Composite Key

As mentioned above, the rows that are selected by a query that contains a percentile function are distributed, based on M ranges, among M processes. However, the distribution cannot be based solely on the group-by key when the group-by key has fewer than M values. For example, it makes no sense to establish 20 ranges for a key such as "day of week", which only has 7 distinct values. Therefore, according to one embodiment, the key used to establish the ranges is a composite key that is formed by combining the group-by key with the sort-by key specified by the query that contains the percentile function. As mentioned above, the composite key may also include aggregate codes and cycle sequence numbers.

Figure 3:
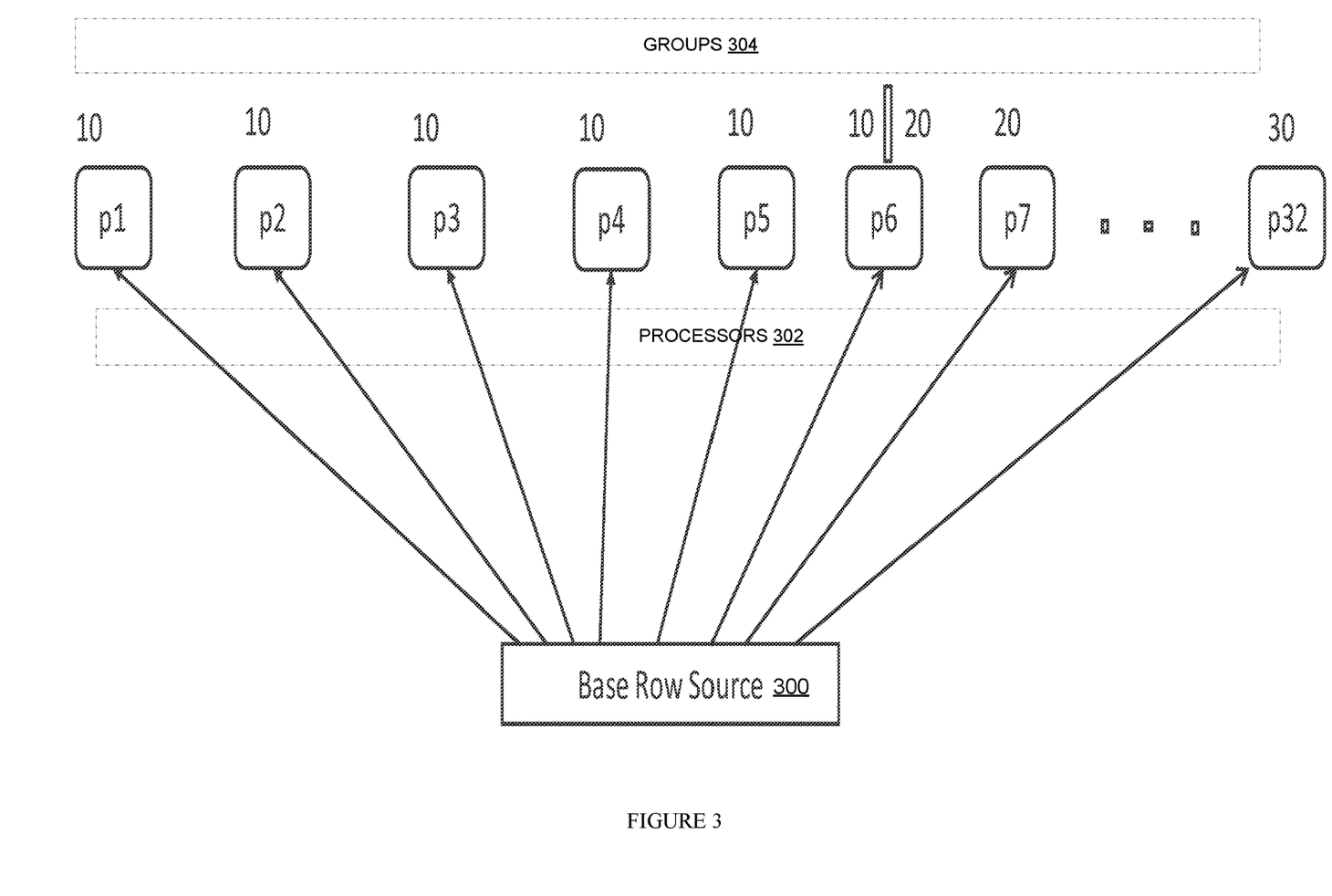
FIG. 3 illustrates a scalable approach of distributing work to processes on receiving a database query with a percentile function, according to one embodiment.

FIG. 3 illustrates a scalable approach of distributing to most processes on receiving a database query with a percentile function, according to one embodiment. As opposed to the illustration in FIG. 1, consider the following query:

```
Select /* + PARALLEL(32) */
    sum(SAL),
    Percentile_disc(0.4) within group(order by SAL)
    From EMP
    Group by DEPTNO
```

In the above query, the group-by key is "DEPTNO" and the order by key is "SAL". Thus, the composite key used to distribute the rows among the 32 processes may have the form DEPTNO.SAL. Thus, a row containing the values <NAME: "Fred", DEPTNO: 10, AGE: 30, SAL: 50000> would have the composite key 10.5000. The 32 ranges assigned to the 32 processes are ranges of the composite key. Thus, the range assigned to p1 may be [10.0 to 10.500]. The range assigned to p2 may be [10.501 to 10.3000]. In the illustrated example, process p6 receives some rows with a group-by key value of "10", and some rows with a group-by key value of "20". For example, p6 may have been assigned the range [10.1000001 to 20.500].

Similar to the example given in FIG. 1, in this example there are only three distinct values of the group-by key DEPTNO (10,20,30). Previously, each process amongst processes 102 was assigned one of those three distinct values. Consequently, with only three distinct group-by key values, only three processes in 102 were involved in the computation. Other processes in 102 would sit idle. In the current approach, the salary data for the three groups 304 is distributed among thirty-two processes (p1-p32) 302 from base row source 300 (e.g. the table that contains the data targeted by the query that contains percentile function).

Multi-Phase Execution: The Sorting Phase

According to one embodiment, the process of executing a query that contains a percentile function is coordinated by a query coordinator. The query coordinator, which is a component of the database server, may be executing on the same processor as one of the processes p1-p32 to which rows are distributed. According to one embodiment, the query coordinator causes the work required by the query to be performed in phases.

Specifically, once rows have been distributed among processes p1-p32 using range distribution on the composite key, processes p1-p32 perform sort operations (the "first phase"). In one embodiment, during the first phase, each process sorts all records that were sent to it based on the composite key values of the records. Thus, if p1 received records for 70 rows with composite key values that fell into the range [10.0 to 10.500], then p1 would sort those 70 records. Similarly, p2 would sort the records that were sent to p2, which had composite key values in the range [10.501 to 10.3000].

After sorting the values, each process sends to the query coordinator a "local-count" for each group for which the process received any records. The local-count for a group indicates how many records that were sent to a given process have composite key values that contain the group-by key value of the group. For example, since all 70 of the records sent to process p1 had the DEPTNO of "10", the local-count for group "10" for process p1 would be 70.

Processes whose assigned range spans more than one group-by value may have non-zero local-counts for more than one group. For example, process p6 is assigned the range [10.1000001 to 20.500]. Therefore, process p6 may have received some records with the DEPTNO "10", and some rows with the DEPTNO "20". Under these circumstances, the process on p6 may determine a local-count for group "10" to be 31 (meaning that process p6 was sent 31 records with DEPTNO "10"), and a local-count for group "20" to be 40 (meaning that process p6 was sent 40 records with DEPTNO "20").

Multi-Phase Execution: The Results Phase

Upon receiving the local-counts from the various processes, the query coordinator sums the local-counts received for each group to determine a total-count for the group. For the purpose of explanation, it shall be assumed that the sum of the local-counts for group "10" is 100, the sum of the local-counts for group "20" is 200, and the sum of the local counts for group "30" is 1000.

Based on the individual local-counts for a group, the sum of the local-counts of the group, and the measure for the percentile function, it is possible to determine which process will be able to derive the result of the percentile function for the group. For example, assume that the percentile function is MEDIAN, which has a measure of 0.5. If the sum of the local-counts for group "10" is 101, and the measure is 0.5, then the process that has the result for the percentile function for group "10" is the process that has the $51^{st}$ value in the sorted list of records from group "10".

Which process has the $51^{st}$ value for group "10" can be determined based on the local-counts returned by the processes for group "10". Assume that the local-counts for group "10" are as follows: p1=17, p2=18, p3=19, p4=16, p5=20 and p6=10. Based on these local-counts, it can be determined that process p1 has the $1^{st}$ through $17^{th}$ values for group "10". Process p2 has the $18^{th}$ through $35^{th}$ values for group "10". Process p3 has values $36^{th}$ through $54^{th}$ values for group "10". Process p4 has the $55^{th}$ through $70^{th}$ values for group "10". Process p5 has the $71^{st}$ to $90^{th}$ values for group "10". Process p6 has the $91^{st}$ through $100^{th}$ values for group "10". Thus, in this example, process p3 has the $51^{st}$ value for group "10".

In one or more embodiment, query coordinator determines which processes have the results for each group in this manner, and during the results phase causes processes on those processes to return the result values for each of the respective groups. For example, the query coordinator may send to the process of p3 an indication that the $16^{th}$ value for group "10" at process p3 (which is the $51^{st}$ value in the entire value set of group "10") is the result value for group "10".

In another embodiment, the query coordinator does not itself determine which process has the percentile function result for each group. Instead, the query coordinator merely communicates the various local-counts to each of the processes. With all of the local-counts, each process is able to determine the total count for each group, and whether its process has the percentile function results for any of the groups.

Regardless of how the work is distributed between the query coordinator and the processes, at the end of the results phase, for each of the groups, the process that has the percentile function results for the group returns the result of the percentile function for the group to the query coordinator.

Handling Queries with Multiple Percentile Functions

In the examples given above, the received query had a single percentile function. However, queries may have any number of percentile functions, where each percentile function may have a different sort-by key and a different measure. According to one embodiment, queries with multiple percentile functions, within the same group-by clause, are handled in a manner similar to queries with a single percentile function. That is, M processes are used to process the query by establishing M ranges of a composite key, assigning each of the ranges to one the processes, and sending to each of the processes records for the rows that have composite keys that fall into its assigned range.

However, with queries that include multiple percentile functions, (a) a different set of records are sent to the processes for each percentile function in the query, (b) each percentile function in the query is assigned a distinct code, and (b) the composite keys used to distribute the records include code, followed by the group-by key and the sort-by key.

For example, assume that the database server receives the query:

```
SELECT
  PERCENTILE_DISC(0.4) within group (order by c1)
  PERCENTILE_DISC(0.6) within group (order by c2)
FROM emp
GROUP BY DEPTNO;
```

This query asks for (a) the value from column c1 of the row that is after 40% of the selected rows when sorted based on c1, and (b) the value from column c2 of the row that is after 60% of the rows when the rows are sorted based on c2. For the purpose of explanation, assume that the first percentile function is assigned the code "0" while the second percentile function is assigned the code "1". Under these conditions, the processes would be sent records for the first percentile function whose composite keys would have the format <0.deptno.c1>, and records for the second percentile function whose composite keys would have the format <1.deptno.c2>.

Having distributed records in this manner, the processing of the query may proceed in the manner described above. Specifically, during the first phase, each process sorts the records that were sent to its process, and generate local-counts. Specifically, each process produces a local-count for each distinct <code, group> combination for which the process received records. These local counts are then returned to the query coordinator.

During the second phase, the local counts are used to determine which processes have the percentile result values for each <code, group> combination, and the appropriate processes return their respective result values.

In the example above, the composite keys used to distribute the records have the format <code, group-by key value, sort-by key value>. However, in an alternative embodiment, the composite keys used to distribute the records may have the format <group-by key value, code, sort-by key value>. In either case, the processes are able to easily determine local-counts for each distinct combination of <code> and <group-by key value>, and those records having the same code and group-by value will be contiguous after the records sent to each process are sorted.

Handling Continuous Percentile Functions

In the above example, PERCENTILE_DISC is an inverse distribution function that assumes a discrete distribution model. PERCENTILE_DISC takes a percentile value and a sort specification and returns a value from a set. PERCENTILE_CONT is an inverse distribution function that assumes a continuous distribution model. PERCENTILE_CONT takes a percentile value and a sort specification, and returns an interpolated value that would fall into that percentile value with respect to the sort specification.

For example, assume that a database server receives the query:

```
SELECT
PERCENTILE_CONT (0.5) within group (order by c1)
FROM emp
GROUP BY DEPTNO;
```

In the above example, when the percentile function is a continuous percentile function PERCENTILE_CONT, obtaining the percentile function result for the group from the particular process may comprise causing the particular process to interpolate a value that is between two values.

In the example given above, the measure 0.5 indicates a position in a group where the number of values that precede the position is the same as the number of values that follow the position. Thus, if the set includes 101 values, then the $51^{st}$ position satisfies this criterion, and the value in the $51^{st}$ position (after the values of the group have been sorted based on the sort key) is the answer to the percentile function for that group. However, if the set contains an even number of values, there is no position that satisfies this criteria. For example, if the group includes 100 values, then the "target position" would fall between the $50^{th}$ position and the $51^{st}$ position. Consequently, the result of the percentile function for the group is derived by performing an interpolation between the value that resides at the $50^{th}$ position (after sorting) and the value that resides at the $51^{st}$ position (after sorting).

Interpolation is a means of calculating and/or constructing new data points within a pre-defined range of values. The two values may be sort-by values such as c1 from the composite key values that were used to distribute records to processes. As illustrated in the example given above, the result of the PERCENTILE_CONT is computed by interpolation between values of a group after ordering the values that belong to the group.

Using the percentile value (P) and the number of rows (N) in the aggregation group, a row number is computed after ordering the rows with respect to the sort specification c1. The row number (RN) is computed according to the formula RN=(1+(P*(N−1)). If RN is a whole number, then no interpolation is required. However, if RN is not a whole number, then the result of the final result of the percentile function is computed by linear interpolation between the values from rows at row numbers CRN=CEILING(RN) and FRN=FLOOR(RN).

As an example, assume that a group has an even number of values and that the percentile value is 0.5, as in the above example. In this case, PERCENTILE_CONT returns the average of the two middle values, whereas PERCENTILE_DISC returns the value of the first one among the two middle values.

Significantly, the composite value ranges that are assigned to processes, which govern the distribution the records to the processes, may cause the values for row numbers CRN and FRN of a particular group to be distributed to distinct processes. When such is the case, the query coordinator causes one of those processes to provide the relevant value to the other of those processes.

For example, assume that a group has 100 values, and that P is 0.5. Assume further that records for the first 50 values of the group may were sent to process p3, while records for the second 50 values for the group were sent to process p4. Under these circumstances, to compute the PERCENTILE_CONT(0.5) for the group, an interpolation must be made between the $50^{th}$ value of the group (sent to p3) and the $51^{st}$ value of the group (sent to p4). Therefore, the query coordinator causes the process on p3 to send the $50^{th}$ value to p4, or causes the process on p4 to send the 50 value to p3. The values may be sent indirectly. For example, the process on p3 may send the $50^{th}$ value to the query coordinator, and the query coordinator may forward the $50^{th}$ value to p4. In alternative embodiments, the processes may pass the necessary information among themselves. For example, a rule may be established that the process with the lower value passes the value to the process with the higher value. With such a rule, p3 would send the $50^{th}$ value directly to p4. In yet another alternative, the query coordinator itself may be provided the values and perform the interpolation.

Once a process has both values involved in the interpolation, the process at the process performs the interpolation to produce the percentile function result for the relevant group. Stated another way, when the records are distributed across multiple processes, the function PERCENTILE_CONT may involve causing a particular process to interpolate a value that is between two values, where one of the two values is a sort-by value from a composite key value of a record distributed to a first process and the other of the two values is a sort-by value from a composite key value of a record distributed to a second process. In such cases, one of the two processes is sent the relevant sort-by value from the other of the two processes, and a process on the process that receives both values performs the interpolation.

When the Number of Groups Exceeds the Number of Processes

The foregoing sections describe how queries containing percentile functions can be processed efficiently when the number of available processes exceeds the number of distinct values of the group-by key. In cases where the number of groups exceeds the number of available processes, different techniques may be used.

Specifically, according to one embodiment, when the number of groups exceeds the number of available processes, range distribution is not used to distribute the records among the processes. Instead, hash distribution on group-by key is used to distribute the records among the processes. Because the distribution technique varies based on whether the number of groups exceeds the number of processes, a sampling is performed beforehand. This sampling, to determine whether the number of groups exceeds the number of processes, or visa versa, therefore determines the technique (hash or range) used to distribute the records among the processes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
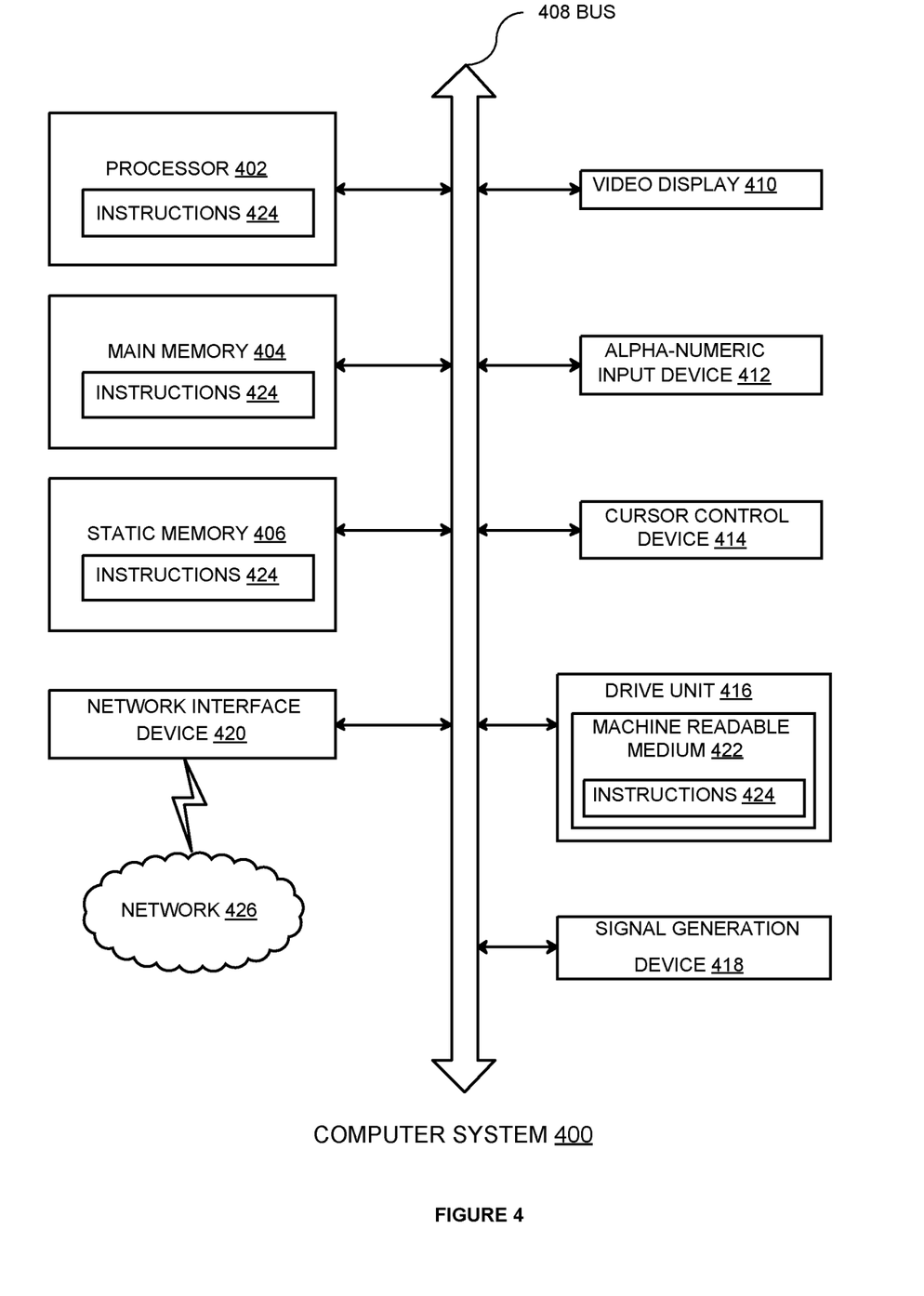
FIG. 4 is a diagrammatic representation of a data processing system capable of processing a set of instructions to perform any one or more of the methodologies herein, according to one embodiment.

FIG. 4 is a diagrammatic representation of a data processing system capable of processing a set of instructions to perform any one or more of the methodologies herein, according to an example embodiment. FIG. 4 shows a diagrammatic representation of machine in the example form of a computer system 400 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 400 includes a processor 402 (e.g., a central processing unit (CPU) a graphics processing unit (GPU) and/or both), a main memory 404 and a static memory 406, which communicate with each other via a bus 408. The computer system 400 may further include a video display unit 410 (e.g., a liquid crystal displays (LCD) and/or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions 424 (e.g., software) embodying any one or more of the methodologies and/or functions described herein. The instructions 424 may also reside, completely and/or at least partially, within the main memory 404 and/or within the processor 402 during execution thereof by the computer system 400, the main memory 404 and the processor 402 also constituting machine-readable media.

The instructions 424 may further be transmitted and/or received over a network 426 via the network interface device 420. While the machine-readable medium 422 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and the like. The term "machine-readable medium" does not refer to signals.

In one or more embodiments, a distributed system may include one or more general purpose computer systems coupled by a network 426. Such computer systems may be, for example, general-purpose computer systems as discussed above with reference to FIG. 4.

For example, FIG. 4 is a block diagram that illustrates a computer system 400 upon which an embodiment of the invention may be implemented. Computer system 400 includes a bus 408 or other communication mechanism for communicating information, and a hardware processor 402 coupled with bus 408 for processing information. Hardware processor 402 may be, for example, a general purpose microprocessor.

The alphanumeric input device 412 typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 402 executing one or more sequences of one or more instructions contained in main memory 404. Such instructions may be read into main memory 404 from another storage medium, such as machine readable medium 422. Execution of the sequences of instructions contained in main memory 404 causes processor 402 to perform the process steps described herein. In alternative embodiments, hard-wired circuitry may be used in place of or in combination with software instructions.

A term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as machine readable medium 422. Volatile media includes dynamic memory, such as main memory 404. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 408. Transmission media can also take the form of acoustic or light waves, such as those generated during radio-wave and infra-red data communications.

Various forms of media may be involved in carrying one or more sequences of one or more instructions to processor 402 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 408. The bus 408 carries the data to main memory 404, from which processor 402 retrieves and executes the instructions. The instructions received by main memory 404 may optionally be stored on machine readable medium 422 either before or after execution by processor 402.

Computer system 400 also includes a communication interface, such as network interface device 420 coupled to bus 408. The network interface device 420 provides a two-way data communication coupling to the network 426. For example, the network interface device 420 may be an integrated services digital network (ISDN) card, cable modem, satellite modem, or a modem to provide a data communication connection to a corresponding type of telephone line. As another example, the network interface device 420 may be a local area network (LAN) card to provide a data communication connection to a compatible LAN. Wireless links may also be implemented. In any such implementation, the network interface device 420 sends and receives electrical, electromagnetic or optical signals that carry digital data streams representing various types of information.

A network link typically provides data communication through one or more networks to other data devices. Computer system 400 can send messages and receive data, including program code, through the network(s), network link and communication interface.

Figure 5:
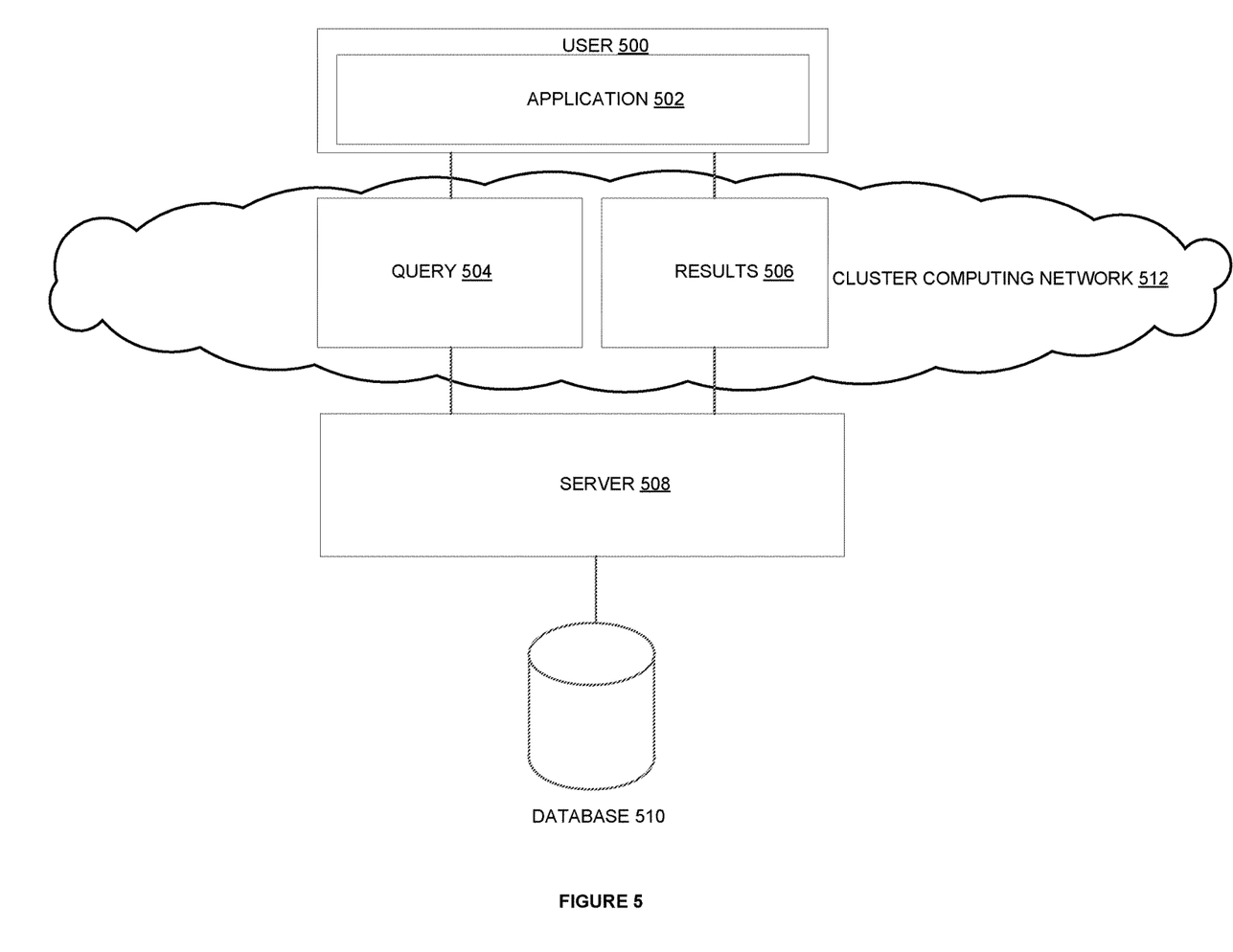
FIG. 5 illustrates an example server-client system for analyzing queries against a database, according to one embodiment.

FIG. 5 illustrates an example server-client system for analyzing queries against a database, according to one embodiment.

FIG. 5 illustrates an example server-client system for analyzing queries against a database, according to one or more embodiments. As shown, a user 500 may interact with an application 502 to generate a query 504 or queries that are to be executed against a database 510. The application 502 submits the query 504 to a server 508 over a cluster computing network 512, and the server 508 accesses the database 510 to evaluate the query 504. The server 508 may be a combination of hardware and software specially configured to evaluate queries and provide results 506. The server 508 may be one of many different server instances that are operating against the same database 510. After completing evaluation of the query 504, the server 508 may provide results 506 to application 502, and application 502 may display these results 506 to user 500.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for processing database queries containing percentile functions, where the percentile functions produce fewer groups than there are processes available to process the queries, comprising:
   receiving a query containing a percentile function;
   wherein the query targets a set of rows and specifies a sort-by key and a group-by key;

determining that the percentile function specified in the query applies to each of N groups that correspond to N distinct values of the group-by key;

determining that it is desirable to process the query using M processes, where M is greater than N;

determining M ranges of a composite key formed by combining the group-by key and the sort-by key;

assigning each range of the M ranges to a corresponding process of the M processes;

for each row in the set of rows, performing the steps of:
  forming a composite key value based on:
    a group-by key value associated with the row, and
    a sort-by key value associated with the row; and
  distributing a record that contains the composite key value to the process, of the M processes, that is assigned the range, of the M ranges, into which the composite key value of the row falls;

at each process of the M processes, sorting the records received by the process based on the composite key values contained in the records;

for each group of the N groups, determining whether all records with composite key values that contain the group-by key value of the group were sent to a single process of the M processes;

for each group where all records with composite key values that contain the group-by key value to which the group corresponds were sent to a single process, determining at the single process a percentile function result for the group based on the sorted records for the group;

for each group where records with composite key values that contain the group-by key value to which the group corresponds were sent to two or more processes, performing the steps of:
  identifying the two or more processes that received any records with composite key values containing the group-by key value to which the group corresponds;
  for each process of the two or more of processes, determining a local-count for the group;
    wherein the local-count for the group indicates how many records that were sent to the process have composite key values that contain the group-by key value to which the group corresponds;
  based on (a) the local-counts for the group from the two or more processes and (b) a measure for the percentile function, determining that a particular process of the two or more processes is to compute a percentile function result for the group; and
  obtaining the percentile function result for the group from the particular process;

wherein the method is performed by one or more computing devices.

2. The method of claim 1 wherein determining M ranges comprises sampling a subset of the set of rows and, based on the sampling, determining the M ranges based on the sampling such that each range of the M ranges covers approximately a same number of rows from the set of rows as each other range of the M ranges.

3. The method of claim 1 wherein:
execution of the query is coordinated by a query coordinator and performed by the M processes;
the N groups include a particular group that corresponds to a particular group-by value;
a particular plurality of processes are sent records with composite key values that include the particular group-by value;
the method further comprises:
  during a first phase, each process of the particular plurality of processes:
    sorting all records that were sent to the process; and
    sending to the query coordinator the local-count for the particular group; and
  the query coordinator summing the local-counts received for the particular group to determine a total-count for the particular group.

4. The method of claim 3 further comprising determining which process of the particular plurality of processes is to compute the percentile function for the particular group based on:
the total-count for the particular group;
the local-counts for the particular group; and
the measure for the percentile function.

5. The method of claim 3 further comprising:
during a second phase, the query coordinator communicating to a particular process of the plurality of processes:
  the total-count for the particular group; and
  the measure for the percentile function; and
based on the total-count for the particular group, the measure for the percentile function, and the records for the particular group that were sorted by the particular process, the particular process determining the percentile function result for the particular group.

6. The method of claim 1 wherein:
the percentile function is a first percentile function;
the sort-by key is a first sort-by key;
the composite key is a first composite key;
the query also contains a second percentile function associated with a second sort-by key;
the second sort-by key is different than the first sort-by key; and
the method further comprises:
determining M ranges of a second composite key formed by combining the group-by key and the second sort-by key;
for each row in the set of rows, performing the steps of:
  forming a second composite key value based on:
    the group-by key value associated with the row, and
    a second sort-by key value associated with the row; and
  distributing a record with the second composite key value to the process, of the M processes, that is assigned the range, of the M ranges, into which the second composite key value of the row falls.

7. The method of claim 6 wherein:
execution of the query is coordinated by a query coordinator and performed by the M processes; and
the method further comprises:
  during a first phase, each process:
    performs a first sort operation by sorting all records with first composite key values that were sent to the process based on the first composite key; and
    performs a second sort operation by sorting all records with second composite key values that were sent to the process based on the second composite key.

8. The method of claim 6 wherein:
the N groups include a particular group associated with a particular group-by key value;
all records with first composite key values that include the particular group-by key value are sent to a single process of the plurality of the M processes; and records with second composite key values that include the particular group-by key value are distributed among multiple processes of the plurality of M processes.

9. The method of claim 1 wherein:
the percentile function is a first percentile function;
the sort-by key is a first sort-by key;
the composite key is a first composite key;
the first composite key includes a first code, the first sort-by key, and the group-by key;
the query also contains a second percentile function associated with a second sort-by key;
the second sort-by key is different than the first sort-by key; and
the method further comprises:
determining M ranges of a second composite key formed by combining the group-by key, the second sort-by key, and a second code that is different than the first code;
for each row in the set of rows, performing the steps of:
forming a second composite key value based on:
the second code;
the group-by key value associated with the row, and
a second sort-by key value associated with the row; and
distributing a record with the second composite key value to the process, of the M processes, that is assigned the range, of the M ranges, into which the second composite key value of the row falls.

10. The method of claim 1 wherein:
the percentile function is a continuous percentile function; and
obtaining the percentile function result for the group from the particular process comprises causing the particular process to interpolate a value that is between two values; and
the two values are sort-by values from the composite key values of records distributed to the particular process.

11. The method of claim 1 wherein:
the percentile function is a continuous percentile function;
obtaining the percentile function result for the group from the particular process comprises causing the particular process to interpolate a value that is between two values;
one of the two values is a sort-by value from a composite key value of a record distributed to the particular process; and
another of the two values is a sort-by value from a composite key value of a record distributed to a process other than the particular process.

12. One or more non-transitory computer-readable media storing instructions for processing database queries containing percentile functions, where the percentile functions produce fewer groups than there are processes available to process the queries, the instructions including instructions which, when executed by one or more computing devices, cause:
receiving a query containing a percentile function;
wherein the query targets a set of rows and specifies a sort-by key and a group-by key;
determining that the percentile function specified in the query applies to each of N groups that correspond to N distinct values of the group-by key;
determining that it is desirable to process the query using M processes, where M is greater than N;
determining M ranges of a composite key formed by combining the group-by key and the sort-by key;
assigning each range of the M ranges to a corresponding process of the M processes;
for each row in the set of rows, performing the steps of:
forming a composite key value based on:
a group-by key value associated with the row, and
a sort-by key value associated with the row; and
distributing a record that contains the composite key value to the process, of the M processes, that is assigned the range, of the M ranges, into which the composite key value of the row falls;
at each process of the M processes, sorting the records received by the process based on the composite key values contained in the records;
for each group of the N groups, determining whether all records with composite key values that contain the group-by key value of the group were sent to a single process of the M processes;
for each group where all records with composite key values that contain the group-by key value to which the group corresponds were sent to a single process, determining at the single process a percentile function result for the group based on the sorted records for the group;
for each group where records with composite key values that contain the group-by key value to which the group corresponds were sent to two or more processes, performing the steps of:
identifying the two or more processes that received any records with composite key values containing the group-by key value to which the group corresponds;
for each process of the two or more of processes, determining a local-count for the group;
wherein the local-count for the group indicates how many records that were sent to the process have composite key values that contain the group-by key value to which the group corresponds;
based on (a) the local-counts for the group from the two or more processes and (b) a measure for the percentile function, determining that a particular process of the two or more processes is to compute a percentile function result for the group; and
obtaining the percentile function result for the group from the particular process.

13. The one or more non-transitory computer-readable media of claim 12 wherein determining M ranges comprises sampling a subset of the set of rows and, based on the sampling, determining the M ranges based on the sampling such that each range of the M ranges covers approximately a same number of rows from the set of rows as each other range of the M ranges.

14. The one or more non-transitory computer-readable media of claim 12 wherein:
execution of the query is coordinated by a query coordinator and performed by the M processes;
the N groups include a particular group that corresponds to a particular group-by value;
a particular plurality of processes are sent records with composite key values that include the particular group-by value;
the instructions include instructions for:
during a first phase, each process of the particular plurality of processes:
sorting all records that were sent to the process; and
sending to the query coordinator the local-count for the particular group; and
the query coordinator summing the local-counts received for the particular group to determine a total-count for the particular group.

15. The one or more non-transitory computer-readable media of claim 14 further comprising instructions for determining which process of the particular plurality of processes is to compute the percentile function for the particular group based on:
the total-count for the particular group;
the local-counts for the particular group; and
the measure for the percentile function.

16. The one or more non-transitory computer-readable media of claim 14 further comprising instructions for:
during a second phase, the query coordinator communicating to a particular process of the plurality of processes:
the total-count for the particular group; and
the measure for the percentile function; and
based on the total-count for the particular group, the measure for the percentile function, and the records for the particular group that were sorted by the particular process, the particular process determining the percentile function result for the particular group.

17. The one or more non-transitory computer-readable media of claim 12 wherein:
the percentile function is a first percentile function;
the sort-by key is a first sort-by key;
the composite key is a first composite key;
the query also contains a second percentile function associated with a second sort-by key;
the second sort-by key is different than the first sort-by key; and
the instructions include instructions for:
determining M ranges of a second composite key formed by combining the group-by key and the second sort-by key;
for each row in the set of rows, performing the steps of:
forming a second composite key value based on:
the group-by key value associated with the row, and
a second sort-by key value associated with the row; and
distributing a record with the second composite key value to the process, of the M processes, that is assigned the range, of the M ranges, into which the second composite key value of the row falls.

18. The one or more non-transitory computer-readable media of claim 17 wherein:
execution of the query is coordinated by a query coordinator and performed by the M processes; and
the instructions include instructions for:
during a first phase, each process:
performs a first sort operation by sorting all records with first composite key values that were sent to the process based on the first composite key; and
performs a second sort operation by sorting all records with second composite key values that were sent to the process based on the second composite key.

19. The one or more non-transitory computer-readable media of claim 17 wherein:
the N groups include a particular group associated with a particular group-by key value;

all records with first composite key values that include the particular group-by key value are sent to a single process of the plurality of the M processes; and
records with second composite key values that include the particular group-by key value are distributed among multiple processes of the plurality of M processes.

20. The one or more non-transitory computer-readable media of claim 12 wherein:
the percentile function is a first percentile function;
the sort-by key is a first sort-by key;
the composite key is a first composite key;
the first composite key includes a first code, the first sort-by key, and the group-by key;
the query also contains a second percentile function associated with a second sort-by key;
the second sort-by key is different than the first sort-by key; and
the instructions include instructions for:
determining M ranges of a second composite key formed by combining the group-by key, the second sort-by key, and a second code that is different than the first code;
for each row in the set of rows, performing the steps of:
forming a second composite key value based on:
the second code;
the group-by key value associated with the row, and
a second sort-by key value associated with the row; and
distributing a record with the second composite key value to the process, of the M processes, that is assigned the range, of the M ranges, into which the second composite key value of the row falls.

21. The one or more non-transitory computer-readable media of claim 12 wherein:
the percentile function is a continuous percentile function; and
obtaining the percentile function result for the group from the particular process comprises causing the particular process to interpolate a value that is between two values; and
the two values are sort-by values from the composite key values of records distributed to the particular process.

22. The one or more non-transitory computer-readable media of claim 12 wherein:
the percentile function is a continuous percentile function;
obtaining the percentile function result for the group from the particular process comprises causing the particular process to interpolate a value that is between two values;
one of the two values is a sort-by value from a composite key value of a record distributed to the particular process; and
another of the two values is a sort-by value from a composite key value of a record distributed to a process other than the particular process.

* * * * *

UNITED STATES PATENT AND TRADEMARK OFFICE
CERTIFICATE OF CORRECTION

PATENT NO. : 10,719,516 B2
APPLICATION NO. : 16/113633
DATED : July 21, 2020
INVENTOR(S) : Sakamuri et al.

It is certified that error appears in the above-identified patent and that said Letters Patent is hereby corrected as shown below:

On the Title Page

Item [57], Line 14, after "plurality" insert -- of --.

In the Specification

Column 9, Line 59, delete "RN=(1+(P*(N-1))." and insert -- RN=(1+(P*(N-1))). --, therefor.

Column 10, Line 21, delete "50" and insert -- 51$^{st}$ --, therefor.

Column 10, Line 65, delete "visa" and insert -- vice --, therefor.

Column 11, Line 33, delete "and or" and insert -- and/or --, therefor.

Column 11, Line 38, delete "and or" and insert -- and/or --, therefor.

Column 14, Line 44, delete "DbaaS" and insert -- DBaaS --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*